(12) United States Patent
Yang

(10) Patent No.: US 10,904,746 B2
(45) Date of Patent: Jan. 26, 2021

(54) IMPLEMENTATION METHOD, APPARATUS AND SYSTEM FOR REMOTE ACCESS

(71) Applicant: ZTE CORPORATION, Guangdong (CN)

(72) Inventor: Kun Yang, Guangdong (CN)

(73) Assignee: SHANGHAI ZTE SOFTWARE CO., LTD., Shanghai (CN)

( * ) Notice: Subject to any disclaimer, the term of this patent is extended or adjusted under 35 U.S.C. 154(b) by 214 days.

(21) Appl. No.: 16/096,415

(22) PCT Filed: May 6, 2016

(86) PCT No.: PCT/CN2016/081326
§ 371 (c)(1),
(2) Date: Oct. 25, 2018

(87) PCT Pub. No.: WO2017/136979
PCT Pub. Date: Aug. 17, 2017

(65) Prior Publication Data
US 2019/0223004 A1     Jul. 18, 2019

(30) Foreign Application Priority Data
Feb. 14, 2016   (CN) .......................... 2016 1 0085051

(51) Int. Cl.
*H04L 12/24*  (2006.01)
*H04W 88/16*  (2009.01)
*H04W 8/24*   (2009.01)
(Continued)

(52) U.S. Cl.
CPC .......... *H04W 8/245* (2013.01); *H04L 12/283* (2013.01); *H04L 12/2807* (2013.01);
(Continued)

(58) Field of Classification Search
CPC .... H04L 67/34; H04L 67/125; H04L 41/0806
See application file for complete search history.

(56) References Cited

U.S. PATENT DOCUMENTS

2010/0083356 A1 * 4/2010  Steckley ............. H04L 12/2818
                                                          726/5
2015/0156266 A1   6/2015  Gupta
(Continued)

FOREIGN PATENT DOCUMENTS

CN    104836836 A    8/2015
CN    105072148 A    11/2015
(Continued)

OTHER PUBLICATIONS

International Search Report dated Oct. 31, 2016 for International Application No. PCT/CN2016/081326, 5 pages.
Written Opinion of the International Searching Authority dated Oct. 31, 2016 for International Application No. PCT/CN2016/081326, 8 pages.
Extended European Search Report in Application No. EP 16889707.2 dated Jul. 24, 2019 in 8 pages.

*Primary Examiner* — Joshua Joo
(74) *Attorney, Agent, or Firm* — Knobbe, Martens, Olson & Bear, LLP

(57) ABSTRACT

Disclosed are implementation methods, apparatuses and systems for remote access. The method can include: a mobile device, MD, transmitting a first resource updating request to a cloud server, CS; according to the first resource updating request, the CS creating an attribute "remote configuration file" of a resource, and generating and transmitting a notification resource creation request to a gateway agent, GA, where the notification resource creation request includes a parameter "remote configuration file"; according to the parameter "remote configuration file" of the notification resource creation request, the GA activating a local remote configuration file; the CS receiving a remote access request transmitted by the MD, and according to an attribute "notified attribute" of an updated resource, forwarding the remote access request to the GA; and according to the activated remote configuration file, the GA executing the remote access request.

19 Claims, 4 Drawing Sheets

(51) Int. Cl.
*H04L 12/28* (2006.01)
*H04L 29/08* (2006.01)
*H04W 4/80* (2018.01)
*H04W 4/70* (2018.01)
*H04W 8/02* (2009.01)
*H04W 12/06* (2009.01)

(52) U.S. Cl.
CPC ...... *H04L 12/2814* (2013.01); *H04L 12/2836* (2013.01); *H04L 41/0806* (2013.01); *H04L 41/0843* (2013.01); *H04L 67/10* (2013.01); *H04L 67/125* (2013.01); *H04L 67/16* (2013.01); *H04L 67/34* (2013.01); *H04W 4/70* (2018.02); *H04W 4/80* (2018.02); *H04W 8/02* (2013.01); *H04W 88/16* (2013.01); *H04W 12/06* (2013.01)

(56) References Cited

U.S. PATENT DOCUMENTS

| | | | |
|---|---|---|---|
| 2015/0312113 A1 | 10/2015 | Forutanpour et al. | |
| 2017/0055156 A1* | 2/2017 | Myers | H04W 12/04 |
| 2017/0093915 A1* | 3/2017 | Ellis | H04W 12/08 |
| 2018/0331843 A1* | 11/2018 | Bag | H04L 12/2814 |

FOREIGN PATENT DOCUMENTS

| | | |
|---|---|---|
| CN | 105072149 A | 11/2015 |
| CN | 105141601 A | 12/2015 |
| EP | 3060018 A1 | 8/2016 |
| WO | 2014169804 A1 | 10/2014 |
| WO | WO 2015/167666 A1 | 11/2015 |

\* cited by examiner

IMPLEMENTATION METHOD, APPARATUS AND SYSTEM FOR REMOTE ACCESS

CROSS REFERENCE TO RELATED APPLICATIONS

This application is the U.S. National Phase Application, under 35 U.S.C. § 371, of International Patent Application NO. PCT/CN2016/081326, filed on May 6, 2016, which claims priority to Chinese Patent Application No. CN201610085051.8 filed on Feb. 14, 2016, the entire disclosure of each of which is incorporated herein by reference in their entireties.

TECHNICAL FIELD

The present application relates to, but is not limited to, a mobile communication field.

BACKGROUND

In an AllJoyn (AJ) system, users can enjoy an AllJoyn service by using their AllJoyn devices in a near-end network (such as a home network). Users can seamlessly experience the AllJoyn service by using an AllJoyn gateway agent (GA) when leaving the near-end network, as shown in FIG. 1. Therefore after setting up a list of remotely accessible services in the near-end network, the user can remotely accesses the AllJoyn service through a cloud server (CS), where the list may include devices, applications (Apps), and interfaces.

A control unit of a mobile device (MD) enables the user to set up a remote configuration file in the near-end network, and to control the device and receive notifications after leaving the near-end network as if the user were in the near-end network.

The third-party protocol utilizing between the communication of the GA and the CS is specified by a service provider. The components to achieve remote access in the GA include a gateway management unit and a connector unit.

The gateway management unit is used for achieving that the remote configuration file is managed by the control unit and exposed to the connector unit.

The connector unit is used for providing a connection between AllJoyn devices and the CS, and providing a protocol conversion between AllJoyn and third-party protocols.

The control unit discovers the gateway management unit in an advertisement-based manner, and the gateway management unit and the connector unit communicate with each other via a same AllJoyn router preset on the GA.

When the user needs to remotely access the AllJoyn service by using a device or an application that is not set remotely accessible in the near-end network, an existing solution is shown in FIG. 2. The GA creates and updates resources including an attribute "remote configuration file" in the CS. After updating the attribute "remote configuration file" of the resources in the cloud server, the MD initiates a remote access request to the GA. After receiving the remote access request from the MD, the GA obtains the update of the configuration file from the CS. After determining the MD is set in the updated remote configuration file, the GA executes the remote access request and feeds back a remote access response.

However, when the remote configuration file is deactivated or deleted in the gateway agent, no corresponding solution in the existing art exists about how to solve the problem that the user needs to remotely access the AllJoyn service.

SUMMARY

The following is a summary of a subject matter described herein in detail. The summary is not intended to limit the scope of the claims.

An implementation method, apparatus and system for a remote access are provided herein and can remotely access an AllJoyn service when a remote configuration file is deactivated or deleted in a gateway agent.

An embodiment of the present disclosure provides an implementation method for remote access, being applied to a gateway agent (GA) and including the following steps.

Receiving a notification resource creation request transmitted by a cloud server (CS), where the notification resource creation request is generated according to a first resource updating request from a mobile device (MD).

Activating a local remote configuration file according to a parameter "remote configuration file" of the notification resource creation request.

Executing, upon receiving a remote access request from the MD, the remote access request according to the activated local remote configuration file.

An embodiment of the present disclosure further provides an implementation method for remote access, being applied to a cloud server (CS) and including the following steps.

Receiving a first resource updating request transmitted by a mobile device (MD).

According to the first resource updating request, creating an attribute "remote configuration file" of a resource, and generating and transmitting a notification resource creation request to a gateway agent (GA).

Forwarding, upon receiving a remote access request from the MD, the remote access request to the GA.

An embodiment of the present disclosure further provides an implementation method for remote access, including the following steps.

Transmitting, by a mobile device (MD), a first resource updating request to a cloud server (CS);

According to the first resource updating request, creating, by the CS, an attribute "remote configuration file" of a resource, and generating and transmitting a notification resource creation request to a gateway agent (GA), where the notification resource creation request includes a parameter "remote configuration file".

activating, by the GA, according to the parameter "remote configuration file" of the notification resource creation request, a local remote configuration file.

receiving, by the CS, a remote access request transmitted by the MD, and forwarding the remote access request to the GA.

executing, by the GA, according to the activated local remote configuration file, the remote access request.

An embodiment of the present disclosure further provides an implementation apparatus for remote access, being set in a gateway agent (GA) and including the following modules.

A first receiving module is configured to receive a notification resource creation request transmitted by a cloud server (CS), where the notification resource creation request is generated according to a first resource updating request from a mobile device (MD).

A first configuration module is configured to activate a local remote configuration file according to a parameter "remote configuration file" of the notification resource creation request.

An executing module is configured to, upon receiving a remote access request from the MD, execute the remote access request according to the activated local remote configuration file.

An embodiment of the present disclosure further provides an implementation apparatus for remote access, being set in a cloud server (CS) and including the following modules.

A second receiving module is configured to receive a first resource updating request transmitted by a mobile device (MD).

A second configuration module is configured to create an attribute "remote configuration file" of a resource and generate a notification resource creation request according to the first resource updating request.

A second transmitting module is configured to transmit the generated notification resource creation request to a gateway agent (GA).

A forwarding module is configured to forward, upon receiving a remote access request from the MD, the remote access request to the GA.

An embodiment of the present disclosure further provides an implementation system for remote access, including: a gateway agent (GA), a cloud server (CS), and a mobile device (MD).

The mobile device (MD) transmits a first resource updating request to the cloud server (CS).

The CS creates an attribute "remote configuration file" of a resource, and generates and transmits a notification resource creation request to the gateway agent (GA) according to the first resource updating request, where the notification resource creation request includes a parameter "remote configuration file".

The GA activates, according to the parameter "remote configuration file" of the notification resource creation request, a local remote configuration file;

The CS receives a remote access request transmitted by the MD, and forwards the remote access request to the GA.

The GA executes, according to the activated local remote configuration file, the remote access request.

Other aspects may be understood after the drawings and detailed description are read and understood.

DETAILED DESCRIPTION

Embodiments of the present disclosure will be described below in conjunction with the drawings. It should be noted that if not in collision, the embodiments described herein and the various methods therein may be combined with each other.

Figure 3:
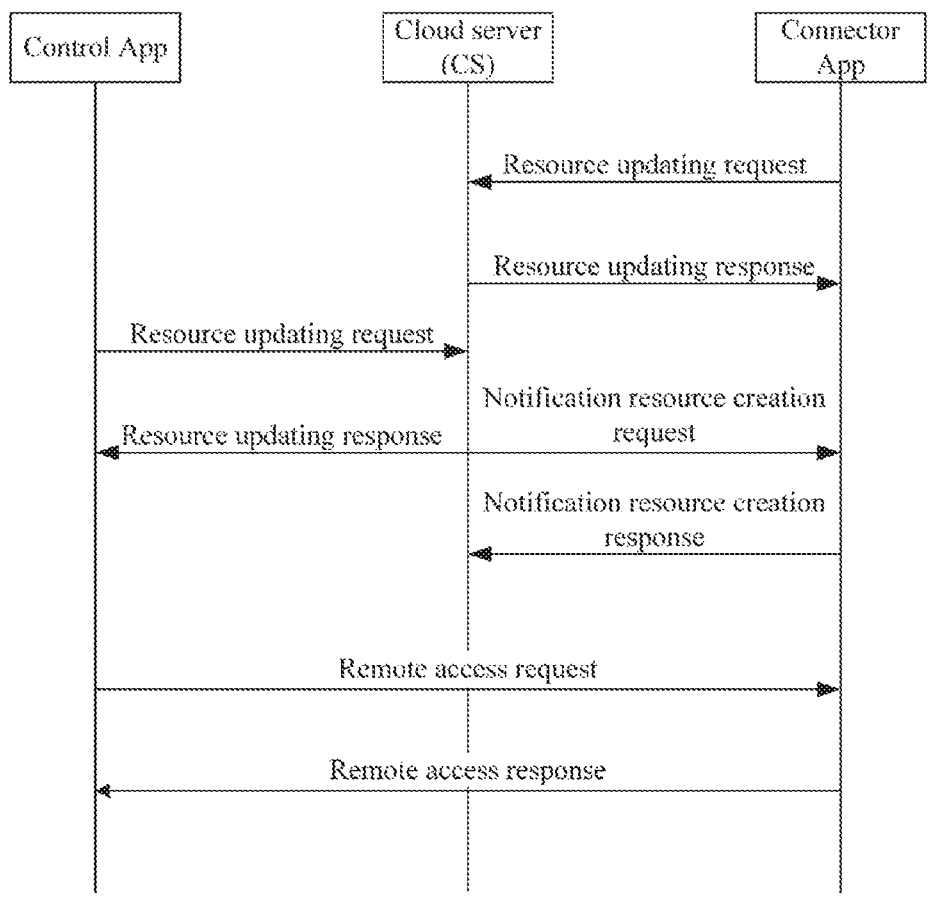
FIG. 3 is a flowchart of remote access of the AllJoyn service according to an embodiment of the present disclosure.
Figure 4:
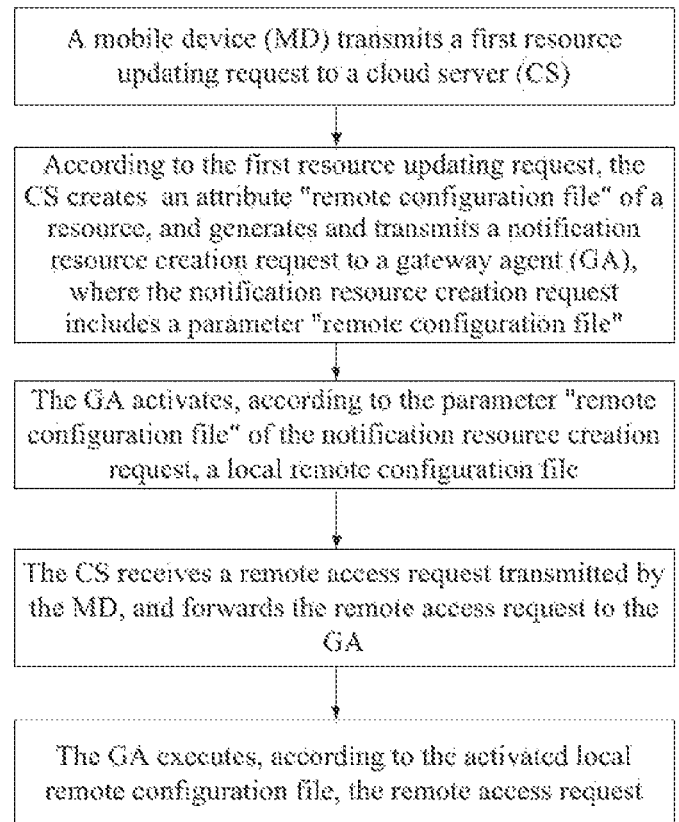
FIG. 4 is a flowchart of an implementation method for remote access according to an embodiment of the present disclosure.

As shown in FIGS. 3 and 4, an embodiment of the present disclosure provides an implementation method for remote access, including steps described below.

A mobile device (MD) transmits a first resource updating request to a cloud server (CS).

According to the first resource updating request, the CS creates an attribute "remote configuration file" of a resource, and generates and transmits a notification resource creation request to a gateway agent (GA), where the notification resource creation request includes a parameter "remote configuration file".

According to the parameter "remote configuration file" of the notification resource creation request, the GA activates a local remote configuration file.

The CS receives a remote access request transmitted by the MD, and forwards the remote access request to the GA.

According to the activated local remote configuration file, the GA executes the remote access request.

In the embodiment of the present disclosure, a control unit (also referred to as "control application") of the mobile device (MD) transmits the first resource updating request to the cloud server (CS), requests the cloud server (CS) to create the attribute "remote configuration file" of the resource, and notifies the attribute "remote configuration file" of the resource to a connector unit (also referred to as "connector application") of the AJ gateway agent (GA), where an value of the attribute "remote configuration file" includes an identifier of the control unit.

The cloud server (CS) creates the attribute "remote configuration file" of the resource and transmits the notification resource creation request to the connector unit of the gateway agent (GA), and the notification resource creation request includes the parameter "remote configuration file".

The connector unit creates a notification resource, activates the remote configuration file in the gateway agent according to the parameter "remote configuration file", and sets a value of the remote configuration file to include the identifier of the control unit.

After receiving the remote access request from the control unit of the mobile device (MD), the cloud server (CS) retrieves whether the attribute "remote configuration file" exists in the attribute "notified attribute" of the resource, determines whether the identifier of the control application is set in the attribute "remote configuration file", and forwards the remote access request to the connector application upon a determination that the attribute "remote configuration file" exists in the attribute "notified attribute" of the resource and the identifier of the control application is set in the attribute "remote configuration file".

After receiving the remote access request, the connector unit of the AJ gateway agent executes the remote access request upon confirming that the identifier of the control unit is set in the remote configuration file, and transmits a remote request response to the control application.

Before the MD transmits the first resource updating request to the CS, the method may further include a step described below.

The GA transmits a second resource updating request to the CS, where the second resource updating request indicates a deletion of the attribute "remote configuration file" of the resource. The second resource updating request includes an address and contents of the resource, where the contents of the resource include an indication to delete the attribute "remote configuration file", in order to indicate a deletion of the attribute "remote configuration file" of the resource.

After the second resource updating request is transmitted to the CS, the method may further include a step described below.

The CS deletes the attribute "remote configuration file" of the resource and transmits a second resource updating response to the GA.

The processing flow of the GA and the CS in the above process is introduced below.

Figure 5:
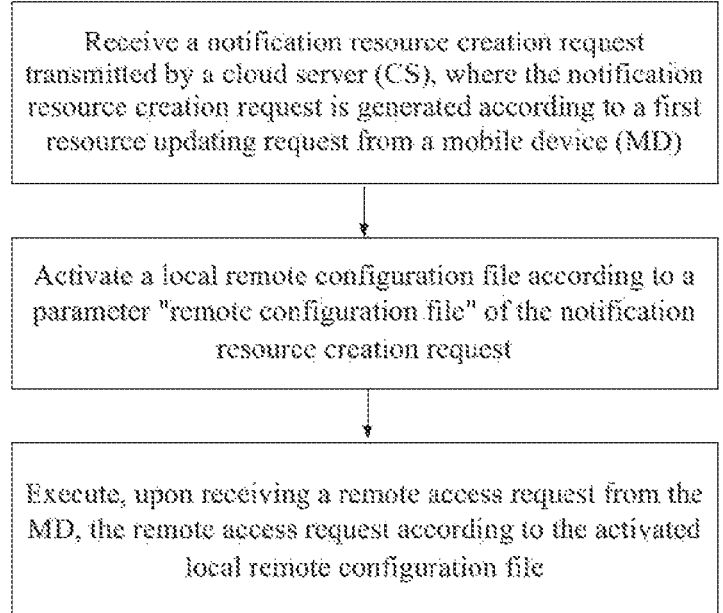
FIG. 5 is a flowchart of an implementation method for remote access according to an embodiment of the present disclosure.

As shown in FIG. 5, an embodiment of the present disclosure further provides an implementation method for remote access, which is applied to a gateway agent (GA) and includes steps described below.

A notification resource creation request transmitted by a cloud server (CS) is received, where the notification resource creation request is generated according to a first resource updating request from a mobile device (MD).

A local remote configuration file is activated according to a parameter "remote configuration file" of the notification resource creation request.

When a remote access request from the MD is received, the remote access request is executed according to the activated local remote configuration file.

In the embodiment, before the GA receives the notification resource creation request transmitted by the CS, the method further includes a step described below.

A second resource updating request is transmitted to the CS, where the second resource updating request includes a deletion of an attribute "remote configuration file" of a resource.

In the embodiment, after the GA transmits the second resource updating request to the CS, the method further includes a step described below.

A second resource updating response transmitted by the CS is received after the CS deletes the attribute "remote configuration file" of the resource.

In the embodiment, after the GA receives the notification resource creation request transmitted by the CS, the method further includes that: a notification resource is created for the resource in the notification resource creation request, the attribute "remote configuration file" is created and an attribute value is set according to the parameter "remote configuration file", a notification resource creation response, carrying the address of the notification resource, is transmitted to the CS.

In the embodiment, the value of the parameter "remote configuration file" includes an identifier of a control application in the MD; after receiving the notification resource creation request transmitted by the CS, the GA activates the local remote configuration file according to the parameter "remote configuration file" of the notification resource creation request, and further sets the value of the remote configuration file to include the identifier of the control application.

In the embodiment, the remote access request is transmitted by the control unit of the MD, and after the remote access request is received by the GA, the method further includes that: the GA performs an authentication of the control application, including determining whether the identifier of the control application is set in the local remote configuration file, and GA executes the remote access request when the identifier of the control application is set in the local remote configuration file.

In the embodiment, after the GA performs the remote access request, the method further includes that: the GA transmits a remote access response to the MD.

In the embodiment, after the GA receives the remote access request from the MD, the method further includes that: the GA performs an authentication of the MD.

Figure 6:
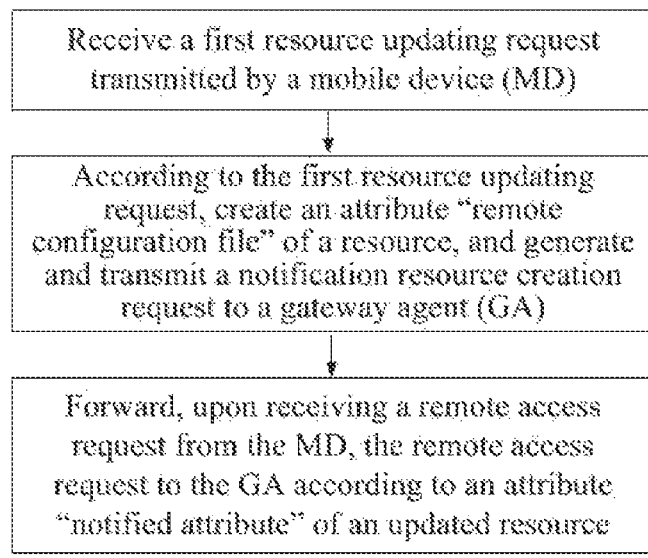
FIG. 6 is a flowchart of an implementation method for remote access according to an embodiment of the present disclosure.

As shown in FIG. 6, an embodiment of the present disclosure further provides an implementation method for remote access, which is applied to a cloud server (CS) and includes steps described below.

A first resource updating request transmitted by a mobile device (MD) is received.

According to the first resource updating request, an attribute "remote configuration file" of a resource is created, and a notification resource creation request is generated and transmitted to a gateway agent (GA).

When a remote access request from the MD is received, the CS forwards the remote access request to the GA.

In the embodiment, before the CS receives the first resource updating request transmitted by the MD, the method further includes steps described below.

A second resource updating request transmitted by the GA is received, where the second resource updating request includes a deletion of an attribute "remote configuration file" of a resource.

The attribute "remote configuration file" of the resource is deleted according to the second resource updating request.

In the embodiment, after the CS deletes the attribute "remote configuration file" of the resource, the method further includes that the CS transmits a second resource updating response to the GA.

In the embodiment, the step that the CS creates the attribute "remote configuration file" of the resource according to the first resource updating request includes that: according to an address of the resource in the first resource updating request, the CS searches for the resource and creates the attribute "remote configuration file" for the resource, where the value of the attribute "remote configuration file" includes an identifier of a control application.

After the CS creates the attribute "remote configuration file" of the resource, the method further includes that: the CS transmits a first resource updating response to the MD.

In the embodiment, the first resource updating request includes a notification parameter, and the notification parameter includes an identifier of a connector application in the GA.

The step that the CS generates the notification resource creation request to the GA according to the first resource updating request includes that: according to the notification parameter, the CS transmits the notification resource creation request for the resource to the connector application in the GA, where the notification resource creation request includes a parameter "remote configuration file", where the value of the parameter "remote configuration file" includes the identifier of the control application.

In the embodiment, after the notification resource creation request is generated by the CS and is transmitted to the GA, the method further includes that: a notification resource creation response transmitted by the GA is received, an address of the notification resource therein is saved in the attribute "notified to" of the resource, and the successfully notified attribute is saved in the attribute "notified attribute" of the resource, where the attribute "notified attribute" of the resource includes the attribute "remote configuration file".

In the embodiment, the remote access request includes the identifier of the control application and the identifier of the connector application. The step that the CS receives and forwards the remote access request from the MD to the GA includes that: according to the identifier of the connector application, the CS retrieves whether the attribute "remote configuration file" exists in the attribute "notified attribute" of the resource, determines whether the identifier of the control application is set in the attribute "remote configuration file", and forwards the remote access request to the connector application in the GA upon a determination that the attribute "remote configuration file" exists in the attribute "notified attribute" of the resource and the identifier of the control application is set in the attribute "remote configuration file".

In the embodiment, after receiving the first resource updating request or the remote access request, the CS further performs authentication of the MD.

In the embodiment, after receiving the second resource updating request transmitted by the GA, the CS further performs authentication of the GA.

Figure 7:
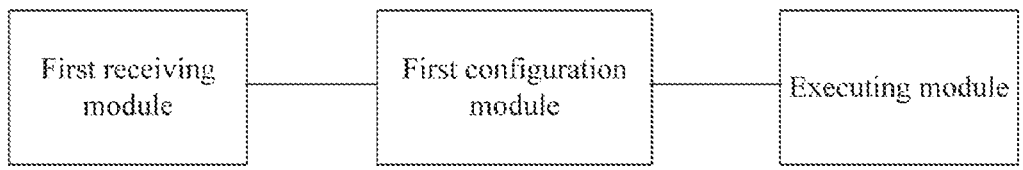
FIG. 7 is a structural view of an implementation apparatus for remote access according to an embodiment of the present disclosure.

As shown in FIG. 7, an embodiment of the present disclosure further provides an implementation apparatus for remote access, which is set in a gateway agent (GA) and including a first receiving module, a first configuration module and a executing module.

The first receiving module is configured to receive a notification resource creation request transmitted by a cloud server (CS), where the notification resource creation request is generated according to a first resource updating request from a mobile device (MD).

The first configuration module is configured to activate a local remote configuration file according to a parameter "remote configuration file" of the notification resource creation request.

The executing module is configured to, upon receiving a remote access request from the MD, execute the remote access request according to the activated local remote configuration file.

In the embodiment, the apparatus further includes a first transmitting module.

The first transmitting module is configured to transmit a second resource updating request to the CS, where the second resource updating request indicates a deletion of an attribute "remote configuration file" of a resource.

The first receiving module is further configured to receive a second resource updating response transmitted by the CS after the CS deletes the attribute "remote configuration file" of the resource.

In the embodiment, the first configuration module is further configured to: create a notification resource for a resource in the notification resource creation request, and according to the parameter "remote configuration file", create the attribute "remote configuration file" for the notification resource and set an attribute value.

In the embodiment, the apparatus further includes a first response module.

The first response module is configured to transmit a remote access response to the MD after the executing module executes the remote access request.

The first response module is further configured to transmit a notification resource creation response to the CS after the first configuration module creates the notification resource.

In the embodiment, the value of the parameter "remote configuration file" of the notification resource creation request received by the first receiving module includes an identifier of a control application in the MD. After receiving the notification resource creation request transmitted by the CS, the first configuration module activates the local remote configuration file according to the parameter "remote configuration file" and further sets the value of the local remote configuration file to include the identifier of the control application.

In the embodiment, the remote access request received by the executing module is transmitted by the control application in the MD. After receiving the remote access request, the executing module further performs authentication of the control application, including determining whether the identifier of the control application is set in the local remote configuration file, and executing the remote access request upon a determination that the identifier of the control application is set in the local remote configuration file.

In the embodiment, the apparatus further includes a first authentication module.

The first authentication module is configured to perform authentication of the MD after receiving the remote access request from the MD.

Figure 8:
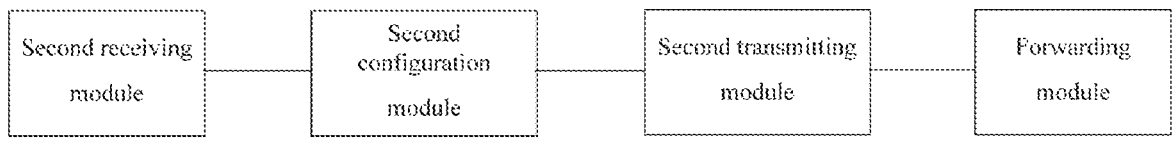
FIG. 8 is a structural view of an implementation apparatus for remote access according to an embodiment of the present disclosure.

As shown in FIG. 8, an embodiment of the present disclosure further provides an implementation apparatus for remote access, which is set in a cloud server (CS) and includes a second receiving module, a second configuration module, a second transmitting module and a forwarding module.

The second receiving module is configured to receive a first resource updating request transmitted by a mobile device (MD).

The second configuration module is configured to according to the first resource updating request, create an attribute "remote configuration file" of a resource and generate a notification resource creation request.

The second transmitting module is configured to transmit the generated notification resource creation request to a gateway agent (GA).

The forwarding module is configured to forward, upon receiving a remote access request from the MD, the remote access request to the GA.

In the embodiment, the second receiving module is further configured to: receive a second resource updating request transmitted by the GA, where the second resource updating request indicates a deletion of the attribute "remote configuration file" of the resource.

The second configuration module is further configured to: delete the attribute "remote configuration file" of the resource according to the second resource updating request.

The apparatus further includes a second response module configured to: transmit a second resource updating response to the GA after the second configuration module deletes the attribute "remote configuration file" of the resource.

The second response module is further configured to transmit a first resource updating response to the MD after creating the attribute "remote configuration file" of the resource according to the first resource updating request.

In the embodiment, the step that the second configuration module creates the attribute "remote configuration file" of the resource according to the first resource updating request includes that: according to an address of the resource in the first resource updating request, the second configuration module searches for the resource and creates the attribute "remote configuration file" for the resource, where the value of the attribute "remote configuration file" of the resource includes an identifier of a control application.

In the embodiment, the first resource updating request received by the second receiving module includes a notification parameter, and the notification parameter includes an identifier of a connector application in the GA.

The notification resource creation request generated by the second configuration module includes a parameter "remote configuration file", and the value of the parameter "remote configuration file" includes the identifier of the control application.

The second transmitting module transmits the generated notification resource creation request to the GA, including that: the second transmitting module transmits the notification resource creation request for the resource to the connector application according to the notification parameter.

In the embodiment, the second receiving module is further configured to: receive a notification resource creation response transmitted by the GA.

The second configuration module is further configured to: save the address of the notification resource in the notification resource creation response into an attribute "notified to" of the resource, and save successfully notified attributes into an attribute "notified attribute" of the resource, where the attribute "notified attribute" of the resource includes the attribute "remote configuration file".

In the embodiment, the remote access request received by the forwarding module includes the identifier of the control application and the identifier of the connector application.

Upon receiving the remote access request from the MD, the forwarding module forwards the remote access request to the GA, including that: according to the identifier of the connector application, the forwarding module retrieves whether the attribute "remote configuration file" exists in the attribute "notified attribute" of the resource, determines whether the identifier of the control application is set in the attribute "remote configuration file", and forwards the remote access request to the connector application in the GA upon the determination that the attribute "remote configuration file" exists in the attribute "notified attribute" of the resource and the identifier of the control application is set in the attribute "remote configuration file".

In the embodiment, the apparatus further includes a second authentication module configured to perform authentication of the MD after the second receiving module receives the first resource updating request or the executing module receives the remote access request.

The second authentication module is further configured to perform authentication of the GA after the second receiving module receives the second resource updating request transmitted by the GA.

An embodiment further provides an implementation system for remote access, where the system includes a gateway agent (GA), a cloud server (CS), and a mobile device (MD).

The mobile device (MD) transmits a first resource updating request to the cloud server (CS).

According to the first resource updating request, the CS creates an attribute "remote configuration file" of a resource, and generates and transmits a notification resource creation request to the gateway agent (GA), where the notification resource creation request includes a parameter "remote configuration file".

According to the parameter "remote configuration file" of the notification resource creation request, the GA activates a local remote configuration file.

The CS receives a remote access request transmitted by the MD, and forwards the remote access request to the GA.

According to the activated local remote configuration file, the GA executes the remote access request.

Embodiment 1

Figure 1:
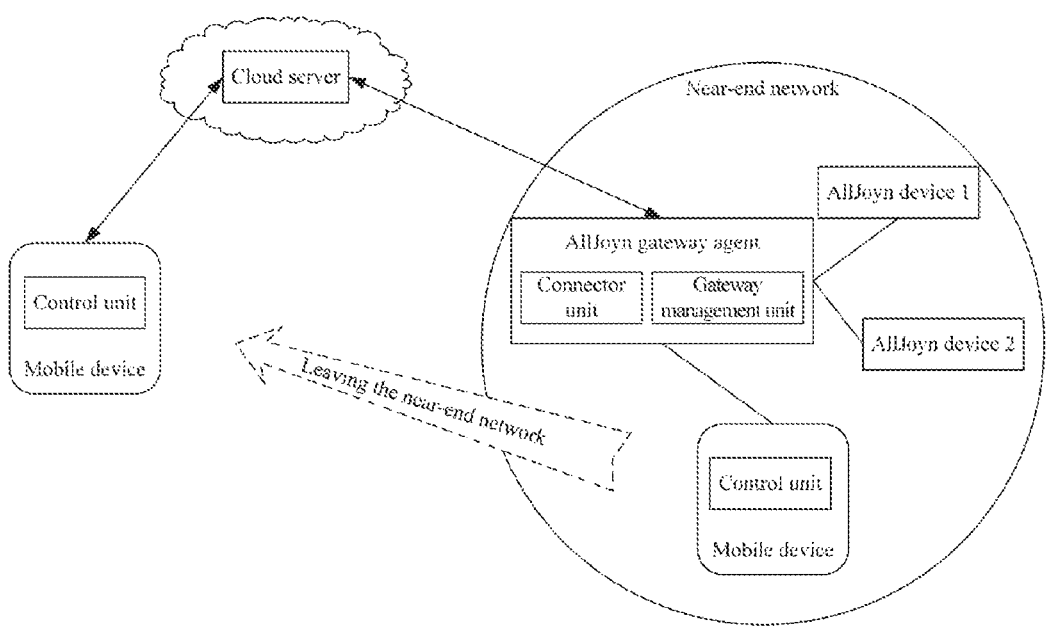
FIG. 1 is a schematic view of remote access of an AllJoyn service in an existing art.
Figure 2:
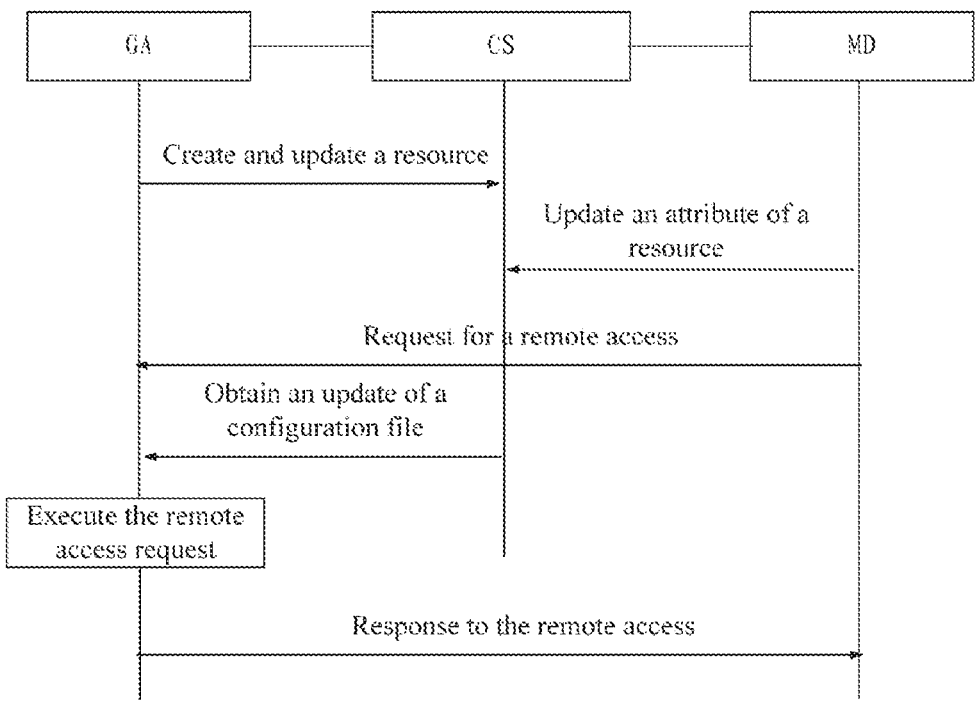
FIG. 2 is a flowchart of remote access of the AllJoyn service in an existing art.

An embodiment provides an implementation method for remotely accessing the AllJoyn service. Referring to FIGS. 1, 3 and 4, the method includes S101-S111.

In S101, when a remote configuration file in a gateway agent is deactivated, a connector application transmits a resource updating request to a cloud server (CS) set in the remote configuration file, and the resource updating request includes the following:
1) an address: a uniform resource identifier (URI) of a resource "Rsc-AJ1"; and
2) content (including related information about attributes of updated resources): deleting an attribute "remote configuration file".

In S102, after performing authentication of the connector application, the CS deletes the attribute "remote configuration file" of the resource "Rsc-AJ1" according to the contents of the resource updating request.

At the same time, the CS transmits a resource updating response to the connector application, and the resource updating response includes a response code indicating that the update is successful.

In S103, when the user needs to remotely access the gateway agent through a mobile device 1 (MD1), the control application in the MD1 transmits the resource updating request to the CS, and the resource updating request includes the following:
1) the address: the URI of the resource "Rsc-AJ1";
2) a notification parameter: an identifier of the connector application in the gateway agent; and
3) content (including related information about attributes of updated resources): creating the attribute "remote configuration file", where the value of the attribute "remote configuration file" includes an identifier of the control application.

In S104, after performing authentication of the control application, the CS searches for the resource "Rsc-AJ1" according to the address of the resource updating request, and creates the attribute "remote configuration file" for the resource "Rsc-AJ1", where the value of the attribute "remote configuration file" includes the identifier of the control application.

At the same time, the CS transmits the resource updating response to the control application, and the resource updating response includes the response code indicating that the update is successful.

In S105, the CS transmits a notification resource creation request for the resource "Rsc-AJ1" to the connector application according to the notification parameter, where the notification resource creation request includes the parameter "remote configuration file", where the value of the parameter "remote configuration file" includes the identifier of the control application.

In S106, the connector application creates the notification resource "Rsc-AJ1_Annc" for the resource "Rsc-AJ1", creates the attribute "remote configuration file" and sets the attribute value for the notification resource "Rsc-AJ1_Annc" according to the parameter "remote configuration file".

At the same time, the connector application transmits the notification resource creation response to the CS, where the notification resource creation response includes an address of the notification resource "Rsc-AJ1_Annc", and a response code indicating that the notification is successful.

In another aspect, according to the parameter "remote configuration file", the connector application activates the remote configuration file in the gateway agent, and sets the value of the remote configuration file to include the identifier of the control application.

In S107, after receiving the notification resource creation response, the CS saves the address of the notification resource in the notification resource creation response into the attribute "notified to" of the resource "Rsc-AJ1", and saves successfully notified attributes into the attribute "notified attribute" of the resource "Rsc-AJ1", where the attribute "notified attribute" of the resource includes the attribute "remote configuration file".

In S108, the control application transmits the remote access request to the CS, for example, the control application requests a remote control of an AJ device 1, where the remote access request includes the identifier of the control application and the identifier of the connector application.

In S109, after performing authentication of the control application, the CS retrieves whether the attribute "remote configuration file" exists in the attribute "notified attribute" of the resource "Rsc-AJ1", determines whether the identifier of the control application is set in the attribute "remote configuration file" and forwards the remote access request to the connector application upon the determination that the attribute "remote configuration file" exists in the attribute "notified attribute" of the resource "Rsc-AJ1" and the identifier of the control application is set in the attribute "remote configuration file".

In S110, after the connector application receives the request message of the control application, the gateway agent performs authentication of the control application, including determining whether the control application is set in the remote configuration file of the gateway agent, and the gateway agent performs the remote access request from the MD1 upon a determination that the control application is set in the remote configuration file of the gateway agent.

In S111, after the gateway agent performs the remote access request from the MD1, the connector application transmits the remote access response to the control application, where the remote access response includes an indication of the execution result.

Embodiment 2

In S201, when a remote configuration file in a gateway agent is deleted, a connector application transmits a resource updating request to a cloud server (CS) set in the remote configuration file, and the resource updating request message includes the following:
1) an address: a URI of a resource "Rsc-AJ1"; and
2) content (including related information about attributes of updated resources): deleting an attribute "remote configuration file".

The remaining steps are the same as those in Embodiment 1, and details are not described herein again.

It will be understood by those of ordinary skill in the art that all or part of the steps in the above-mentioned embodiments may be implemented using one or more computer programs. The computer programs may be stored in a computer-readable storage medium and executed on a corresponding hardware platform (e.g., system, device, apparatus or component). During the execution of these programs, one of or a combination of the steps in the above-mentioned method embodiments is implemented.

Optionally, all or part of the steps in the above-mentioned embodiments may also be implemented using one or more integrated circuits. These steps may be made into integrated circuit modules separately, or part of these modules or steps may be made into a single integrated circuit module for implementation.

The various apparatuses/function modules/function units in the above-mentioned embodiments may be implemented on a general-purpose computing apparatus. They may be concentrated on a single computing apparatus or distributed over a network composed of multiple computing apparatuses.

The various apparatuses/function modules/function units in the above-mentioned embodiments are implemented by software function modules, and can be stored in a computer-readable storage medium when sold or used as stand-alone products. The above-mentioned computer-readable storage medium may be a read-only memory, a magnetic disk, an optical disk, or the like.

INDUSTRIAL APPLICABILITY

Through the solution of embodiments of the present disclosure, the mobile device (MD) transmits the first resource updating request to the cloud server (CS); according to the first resource updating request, the CS creates the attribute "remote configuration file" of the resource, and generates and transmits the notification resource creation request to the gateway agent (GA), where the notification resource creation request includes the parameter "remote configuration file"; according to the parameter "remote configuration file" of the notification resource creation request, the GA activates the local remote configuration file; the CS receives the remote access request transmitted by the MD, and according to the attribute "notified attribute" of the updated resource, the CS forwards the remote access request to the GA; and according to the activated local remote configuration file, the GA executes the remote access request. The mechanism for a user to remotely access the AllJoyn service may be achieved when the remote configuration file is deactivated or deleted in the gateway agent.

What is claimed is:
1. An implementation method for remote accessing an AllJoyn service when a remote configuration file is deactivated or deleted in a gateway agent GA, being applied to the GA, and comprising:
transmitting a first resource updating request, by a connector application of the GA, to a cloud server (CS) set in the remote configuration file, when the remote configuration file in the gateway agent is deactivated or deleted;
according to a first resource updating request from a mobile device, MD, the cloud server, CS, creates an attribute of a resource, wherein the attribute is set to remote configuration file, and generates and transmits a notification resource creation request to the gateway agent, wherein the notification resource creation request includes a parameter for the attribute remote configuration file;
receiving the notification resource creation request transmitted by the cloud server, CS, wherein the notification resource creation request is generated according to the first resource updating request from the MD;
activating a local remote configuration file according to the parameter of the notification resource creation request; and executing, upon receiving a remote access request from the MD, the remote access request according to the activated local remote configuration file,
wherein the method is performed by at least one hardware processor;
after receiving the notification resource creation request transmitted by the CS, further comprising:
creating a notification resource for the resource in the notification resource creation request;
according to the parameter, creating an attribute for the notification resource and setting an attribute value; and transmitting a notification resource creation response, carrying an address of the notification resource, to the CS.

2. The method of claim 1, before receiving the notification resource creation request transmitted by the CS, further comprising:
transmitting a second resource updating request to the CS, wherein the second resource updating request indicates a deletion of the attribute of the resource in the notification resource creation request; and
receiving a second resource updating response transmitted by the CS after the CS deletes the attribute of the resource in the notification resource creation request.

3. The method of claim 1, wherein
a value of the parameter comprises an identifier of a control application in the MD; and
after receiving the notification resource creation request transmitted by the CS, activating the local remote configuration file according to the parameter of the notification resource creation request, and further setting a value of the local remote configuration file to include the identifier of the control application.

4. The method of claim 3, wherein
the remote access request is transmitted by the control application in the MD, and after receiving the remote access request, the method further comprises:
performing authentication of the control application, comprising:
determining whether the identifier of the control application is set in the local remote configuration file; and
executing the remote access request upon a determination that the identifier of the control application is set in the local remote configuration file.

5. The method of claim 2, wherein
a value of the parameter comprises an identifier of a control application in the MD; and
after receiving the notification resource creation request transmitted by the CS, activating the local remote configuration file according to the parameter of the notification resource creation request, and further setting the value of the local remote configuration file to include the identifier of the control application.

6. An implementation apparatus for remote access, being set in a gateway agent, GA, and comprising a processor and a storage device storing computer executable instructions that, when executed by the processor, cause the processor to perform the method of claim 1.

7. A non-transitory computer-readable storage medium storing instructions which, when executed by a processor, cause the processor to perform the method of claim 1.

8. An implementation method for remote accessing an AllJoyn service when a remote configuration file is deactivated or deleted in a gateway agent GA, being applied to a cloud server, CS, set in the remote configuration file, and comprising:
receiving a first resource updating request, transmitted by a connector application of the GA, when the remote configuration file in the gateway agent is deactivated or deleted;
receiving the first resource updating request transmitted by a mobile device, MD;
according to the first resource updating request transmitted by the MD, creating an attribute of a resource, wherein the attribute is set to remote configuration file, generating and transmitting a notification resource creation request to the GA, wherein the notification resource creation request includes a parameter for the attribute remote configuration file; and
forwarding, upon receiving a remote access request from the MD, the remote access request to the GA,
wherein the method is performed by at least one hardware processor;
after the notification resource creation request is generated and transmitted to the GA, further comprising:
receiving a notification resource creation response transmitted by the GA, wherein the notification resource creation response carries an address of a notification resource and the notification resource is created by the CS for a resource of the notification resource creation request.

9. The method of claim 8, before receiving the first resource updating request transmitted by the MD, further comprising:
receiving a second resource updating request transmitted by the GA, wherein the second resource updating request indicates a deletion of the attribute of the resource; and
deleting, according to the second resource updating request, the attribute of the resource, and transmitting a second resource updating response to the GA.

10. The method of claim 8, wherein
creating, according to the first resource updating request, the attribute of the resource comprises:
searching for, according to an address of the resource in the first resource updating request, the resource and creating the attribute for the resource, wherein a value of the attribute of the resource comprises an identifier of a control application; and
after creating the attribute of the resource, the method further comprising: transmitting a first resource updating response to the MD.

11. The method of claim 10, wherein
the first resource updating request comprises a notification parameter: an identifier of the connector application in the GA; and
according to the first resource updating request, generating and transmitting the notification resource creation request to the GA comprises:
transmitting, according to the notification parameter, the notification resource creation request to the connector application in the GA; wherein the notification resource creation request comprises a parameter for the attribute remote configuration file and a value of the parameter comprises the identifier of the control application.

12. The method of claim 11, after the notification resource creation request is generated and transmitted to the GA, further comprising:
saving the address of the notification resource of the notification resource creation response into an attribute of the notification resource, wherein the attribute of the notification resource is set to notified to; and saving successfully notified attributes into another attribute of the resource, wherein the another attribute is set to notified attribute and the another attribute comprises an attribute which is set to remote configuration file.

13. The method of claim 12, wherein the remote access request comprises the identifier of the control application and the identifier of the connector application; and the step of forwarding, upon receiving the remote access request from the MD, the remote access request to the GA comprises:

retrieving, according to the identifier of the connector application, whether the attribute remote configuration file exists in the attribute notified attribute of the resource, determining whether the identifier of the control application is set in the attribute remote configuration file; and forwarding the remote access request to the connector application in the GA upon a determination that the attribute remote configuration file exists in the attribute notified attribute of the resource and the identifier of the control application is set in the attribute remote configuration file.

14. The method of claim 9, after receiving the second resource updating request transmitted by the GA, further comprising:

performing authentication of the GA; and after receiving the first resource updating request or the remote access request, further comprising: performing authentication of the MD.

15. An implementation apparatus for remote access, being set in a cloud server, CS, and comprising a processor and a storage device storing computer executable instructions that, when executed by the processor, cause the processor to perform the method of claim 8.

16. A non-transitory computer-readable storage medium storing instructions which, when executed by a processor, cause the processor to perform the method of claim 8.

17. An implementation method for remote accessing an AllJoyn service when a remote configuration file is deactivated or deleted in a gateway agent GA, comprising:

transmitting, by a mobile device, MD, a first resource updating request to a cloud server (CS) set in the remote configuration file, when the remote configuration file in the gateway agent is deactivated or deleted;

according to the first resource updating request, creating, by the CS, an attribute of a resource, wherein the attribute is set to remote configuration file, generating and transmitting a notification resource creation request to the GA, wherein the notification resource creation request comprises a parameter for the attribute remote configuration file;

activating, by the GA, a local remote configuration file according to the parameter of the notification resource creation request;

receiving, by the CS, a remote access request transmitted by the MD, and forwarding the remote access request to the GA; and executing, by the GA, the remote access request according to the activated local remote configuration file, wherein the method is performed by at least one hardware processor;

after receiving the notification resource creation request transmitted by the CS, further comprising:

creating, by the GA, a notification resource for the resource in the notification resource creation request;

creating, by the GA according to the parameter, an attribute for the notification resource and setting, by the GA, an attribute value; and transmitting, by the GA, a notification resource creation response, carrying an address of the notification resource, to the CS.

18. The method of claim 17, before the MD transmits the first resource updating request to the CS, further comprising:

transmitting, by the GA, a second resource updating request to the CS, wherein the second resource updating request indicates a deletion of the attribute of the resource; and deleting, by the CS, the attribute of the resource and transmitting a second resource updating response to the GA.

19. A non-transitory computer-readable storage medium storing instructions which, when executed by the processor, cause the processor to perform the method of claim 17.

* * * * *